Figure 2:
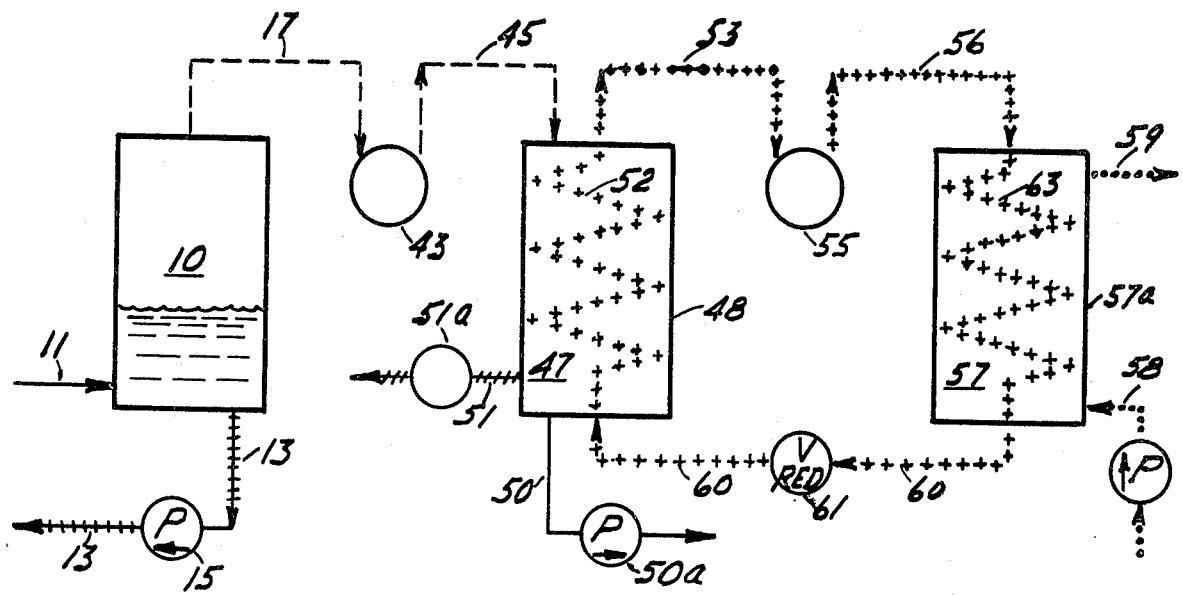

United States Patent [19]

Cox

[11] 4,003,213
[45] Jan. 18, 1977

[54] TRIPLE-POINT HEAT PUMP
[76] Inventor: Robert Bruce Cox, 19 Joan Court, Centerport, N.Y. 11721
[22] Filed: Nov. 28, 1975
[21] Appl. No.: 636,036
[52] U.S. Cl. .................... 62/124; 62/238; 62/324
[51] Int. Cl.² ............ B01D 9/04; C02B 1/12; F25B 27/02; F25B 13/00
[58] Field of Search ............. 62/123, 124, 324, 238
[56] References Cited
UNITED STATES PATENTS

| 2,619,453 | 11/1952 | Andersen | 62/124 |
| 3,098,733 | 7/1963 | Rosenstein et al. | 62/124 |
| 3,285,024 | 11/1966 | Dunn et al. | 62/238 |
| 3,344,616 | 10/1967 | Owen | 62/238 |
| 3,443,393 | 5/1969 | Goldberg | 62/124 |
| 3,477,241 | 11/1969 | Ashley | 62/124 |

Primary Examiner—Lloyd L. King
Attorney, Agent, or Firm—Robert C. Brown

[57] ABSTRACT

This invention relates to heat pump systems variously useful for heating and cooling as well as for the production of potable water and in which the thermal energy employed is derived from heat liberated by the freezing of water under vacuum at the triple point.

13 Claims, 5 Drawing Figures

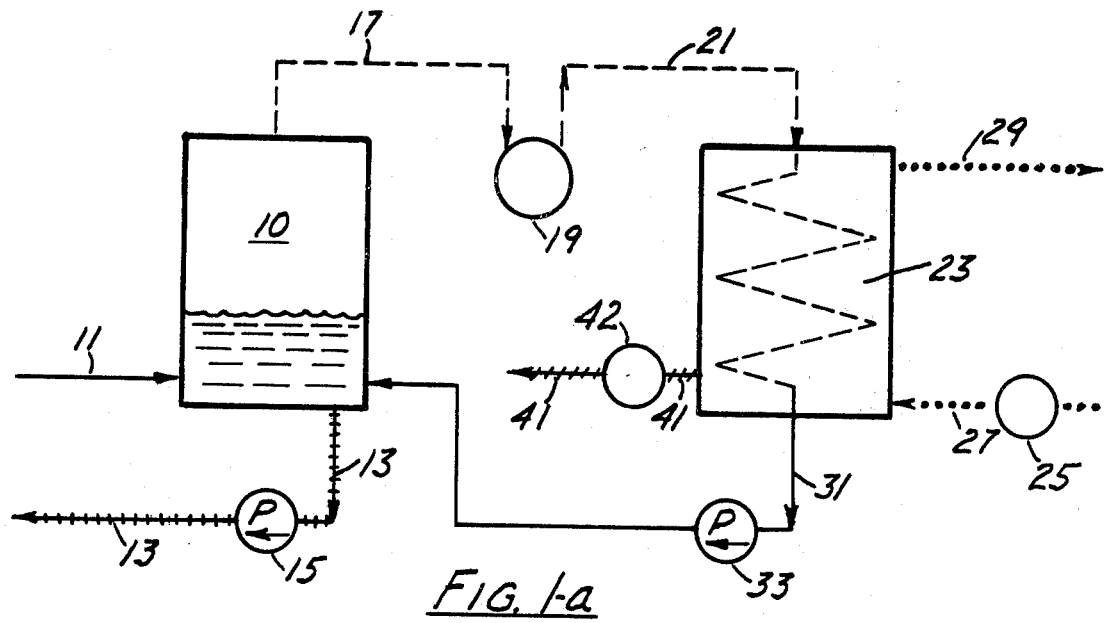
FIG. 1-a
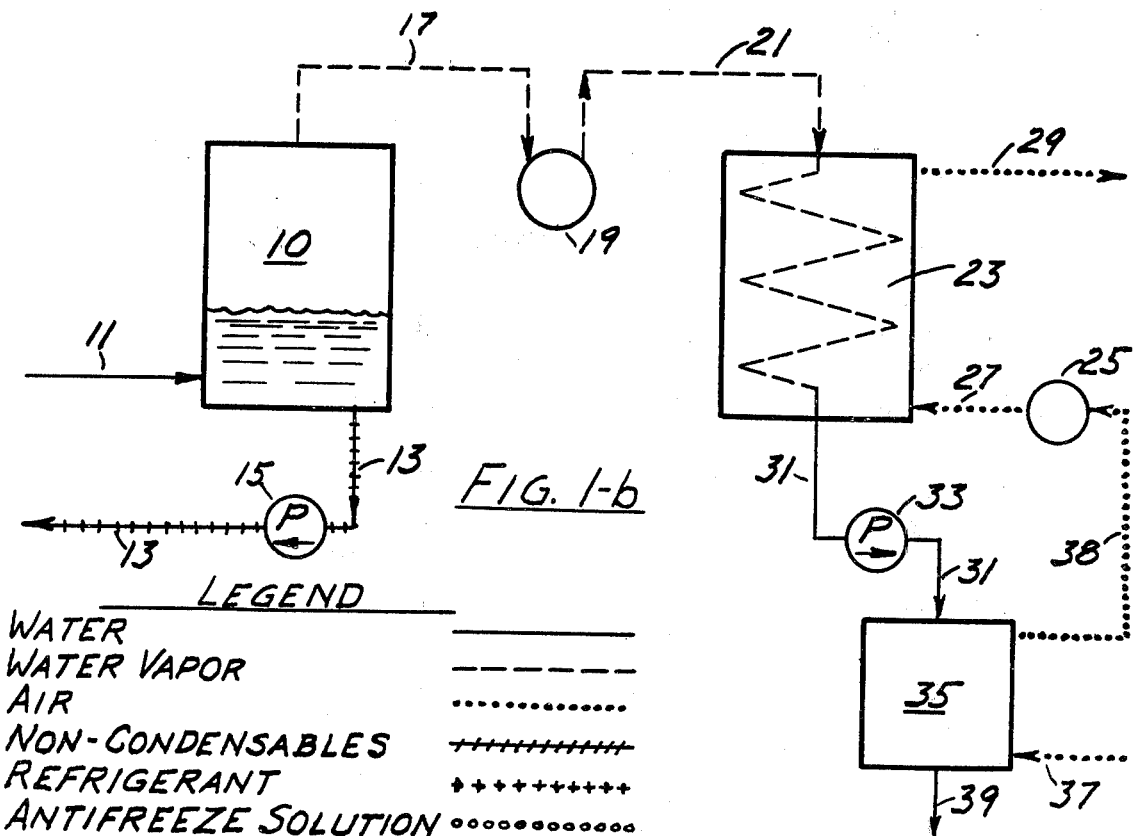
FIG. 1-b
LEGEND
| | |
|---|---|
| WATER | ——— |
| WATER VAPOR | - - - - - |
| AIR | ············ |
| NON-CONDENSABLES | ++++++++ |
| REFRIGERANT | ++++++++ |
| ANTIFREEZE SOLUTION | ooooooooo |
| SEAWATER | xxxxxxxx |
| BRINE | *-*-*-*-*- |
| WASHED ICE | △△△△△△△ |
| ICE SLURRY | ++++++++ |

TRIPLE-POINT HEAT PUMP

BACKGROUND OF THE INVENTION

Despite the fact that the heat pump was first conceived by Lord Kelvin more than a century ago, operating difficulties and economic considerations have severly restricted its use in practical applications.

In its most simple form the heat pump (the term commonly employed when heat is the desired product) or refrigeration cycle (when cooling is desired) is a simple closed system containing a refrigerant such as ammonia or a volatile fluorocarbon. The closed system is usually comprised of an evaporator, a condenser, a compressor, an expansion valve, and various controls. In operation the liquid refrigerant evaporates at a low temperature and pressure inside the evaporator usually a tubular metal coil) and extracts from the surrounding area a quantity of heat equal to its heat of vaporization. The vaporized refrigerant flows to the compressor where it is compressed to a pressure and temperature sufficiently high so that it will condense in the condenser (usually a tubular metal coil), thus giving up its heat of vaporization. In a refrigeration cycle, the heat released in the condenser is wasted to a stream of cooling water or to the atmosphere. In a heat pump the heat released in the condenser is most commonly used to heat a building but is sometimes put to other use. The ASHRAE 1972 Guide and Data Book, Chapter 43, describes the components and operation of a typical heat pump cycle.

The principal obstacle to widespread use of the heat pump cycle has been a lack of a satisfactory heat source. Most heat pumps, up until the present time, have employed ambient air as a heat source due to its universal availability. Unfortunately, such air based systems become uneconomical if the available air temperature drops below about 40° F. It will be appreciated that when heat is extracted from air, the air is cooled and as a result it becomes necessary to move large volumes of air to avoid too great a temperature drop. This requires a very large fan which may be noisy and which consumes a disproportionately large amount of energy. A further temperature drop occurs through the metal heat-transfer surface of the evaporator and as a result, when the ambient air temperature is 40° F, the vaporizing temperature of the refrigerant may be only 10° F. or less. At ambient air temperatures below 40° F. these problems become more severe and operation becomes uneconomical requiring the use of supplemental heat sources. This problem is further aggravated by the build-up of an insulating layer of frost on the metal surfaces due to the freezing of moisture contained in the air. This build-up of frost seriously impairs efficiency and must be removed periodically.

Other heat pump systems use heat sources other than air, such as well water from lakes, streams and oceans. Still others use solar energy or heat from the earth. All of these sources have serious disadvantages such as scale build-up, when ocean water or well water containing minerals is used. Lake and stream water does not provide sufficient heat in winter months when it is most needed. Solar systems and earth systems are very costly to install and solar systems suffer the further disadvantage of unreliability.

It is therefore the principal object of this invention to provide a heat pump system having as an integral element, a heat source which is universally available and which is capable of providing heat at a fixed temperature regardless of ambient temperature and atmospheric conditions.

A further object of this invention is to provide a heat pump system which is not subject to corrosion, scale or ice build-up and which can be installed and operated at relatively low cost.

In accordance with this invention these and other objects are achieved through the use of the heat liberated by the heat of crystallization of water as it freezes. This heat amounts to 144 BTU/lb. of ice which in the case of pure water, is released at 32° F. The usual problems of icing, scaling, and corrosion of the evaporator (the heat-absorbing unit), are avoided by carrying out the freezing in a separate vessel by boiling the water under vacuum at its triple point (about 4.6 mm Hg absolute pressure). The heat released by the crystallization of the water is absorbed as the heat of vaporization and forms an equivalent quantity of water vapor which by compression and condensation can be made to liberate its heat of condensation for useful heating. All heat transfer in such a triple-point freezer occurs at the water surface. As a result there is no metal surface on which to collect ice, form scale, or to corrode. The heat liberated on condensation is approximately equal to the heat of crystallization liberated by the formation of ice, plus the energy consumed in compressing the water vapor. Both the condensed vapor and the ice are pure water, regardless of impurities which may be present in the water being frozen.

The pure water produced by this process may be discarded or used as a source of potable water. The ice produced can be used for cooling or may be melted and also used as a source of potable water.

The heat content of the compressed vapor can be used in a variety of ways as hereinafter described.

The construction and operation of heat pump systems designed in accordance with this invention will be more clearly understood from the following detailed description and accompanying drawings of which:

FIGS. 1a and 1b are schematic diagrams of variations of a simple system illustrating the invention, in which vapor produced in a triple-point freezer is compressed by a multistage vapor compressor and thereafter condensed in an air-cooled condenser to produce heated air for residential or industrial heating.

FIG. 2 is a schematic diagram of a two-stage heat pump system, according to the invention, in which vapor produced in a triple-point freezer is compressed by a single-stage vapor compressor (first stage of heat pump) and subsequently condensed on the evaporator coil of a closed-cycle heat pump (second stage of heat pump) without freezing. Refrigerant vapor produced in the second stage is compressed and subsequently condensed in an air-cooled condenser to produce heated air which may be used for space heating.

Figure 3:
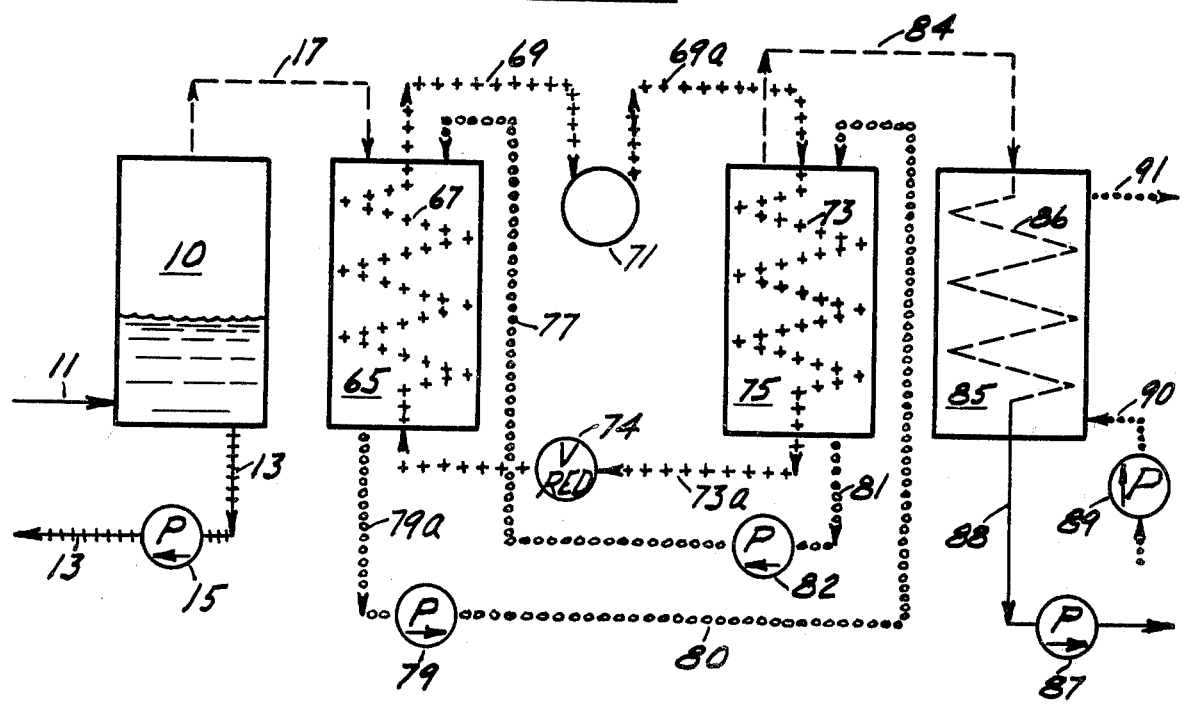

FIG. 3 is a schematic diagram of a preferred heat-pump system according to the invention in which vapor produced in the triple-point freezer is condensed in an antifreeze solution chilled by the evaporator coil of a closed-cycle heat pump. The diluted antifreeze solution is reconcentrated by passage over the hot condensing coil of the heat pump causing dissolved water in the dilute solution to be evaporated. The water vapor thus produced is condensed in an air-cooled condenser to produce heated air which may be used for space heating.

Figure 4:
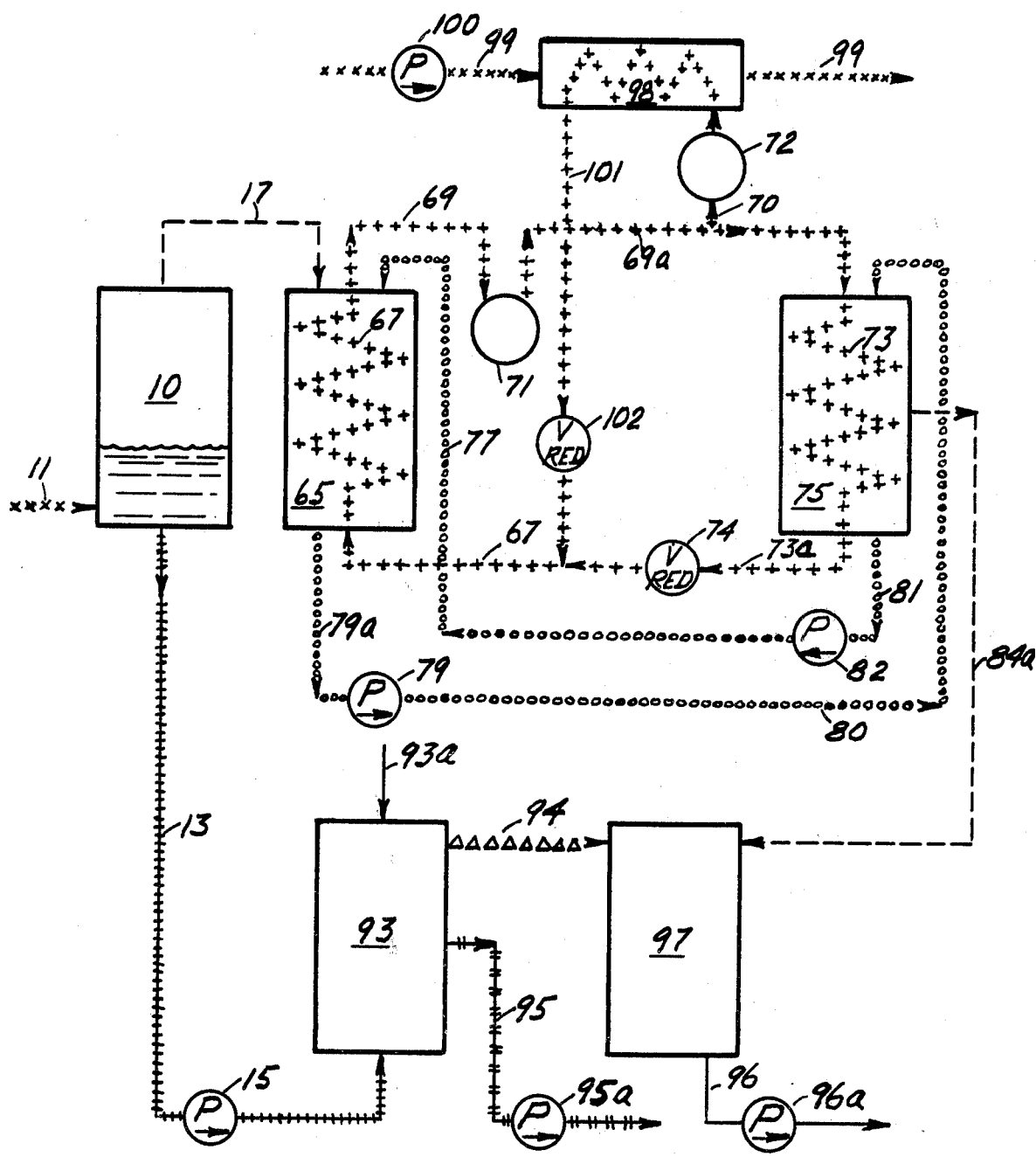

FIG. 4 is a schematic diagram of a heat pump system according to the invention in which the principles of the invention are applied to the production of potable water from a source such as sea water.

The triple-point freezer used as the heat source in the practice of this invention is an essential feature in all embodiments of this invention. These devices are well known in the art. A typical triple-point freezer which may be used in the practice of this invention is illustrated and described in U.S. Pat. No. 3,398,548. A triple-point freezer is comprised generally of a closed vacuum vessel in which means are provided for continuously introducing water or aqueous solution. The vessel is maintained at a pressure slightly below the triple point (the pressure at which ice, water and vapor are in equilibrium) by the continuous removal of vapor from the vessel as it is formed. Ice forming within the vessel is removed continuously, preferably in the form of an ice-water slurry capable of being pumped. The bottom of the vessel is normally provided with an agitator, such as a motor driven propeller to prevent ice caking and to keep the ice in a slurried condition. The continuous removal of water vapor from the interior of the vessel upsets the equilibrium which is restored by the vaporization of additional feed water. The heat required for vaporization is extracted from the water itself but as the water is already at its freezing point this removal of vapor also causes a remaining portion of the water to freeze. Thus water is continuously and simultaneously boiling and freezing within the vessel during operation of the unit. The heat liberated by the freezing of the ice is equal to 144 BTU per pound of ice formed which is extracted by the vapor formed in the simultaneous boiling process. The thermal energy content of the vapor is higher than that of ice and equals about 1073 BTU per pound of vapor.

Referring now to FIG. 1a, a very simple embodiment of the invention is shown is schematic form. In this system feed water (or a water solution such as sea water) enters the triple point freezer 10 via a conduit 11. Ice formed within freezer 10 is removed in the form of a slurry through conduit 13 by slurry pump 15. The ice slurry may be discarded if desired or it can be used as a source of potable water in the case where the feed water is not potable such as where sea water is employed. In the latter case it will be necessary to melt the pure ice crystals after separation from the brine solution which may be accomplished using a conventional ice washer.

Water vapor formed within the vessel is removed continuously through conduit 17 by compressor 19. For large installations compressor 19 is preferably a multistage compressor such as the unit described in "Pery's Chemical Engineers' Handbook," 4th Ed., FIG. 6-38, p. 6-21.

For smaller plants the compressor may be a single stage centrifugal compressor, such as the unit shown in "Perry's Chemical Engineers' Handbook," 5th Ed., FIG. 6-37, p. 6-20, or a single stage positive displacement unit such as a Root's Blower as shown in "Perry's Chemical Engineers' Handbook," 4th Ed., FIG. 6-44, p. 6-23. The selection of the particular type and size of compressor will be dictated by the size of the installation and by economic considerations. Because the specific volume of the vapor is very large, 3300 cubic feet per pound at 32° F, it is necessary for the compressor to drive very large volumes, however the pressure is extremely low and as a result the energy requirement for driving power is also low.

Compressed vapor is pumped by compressor 19 via conduit 21 to an air-cooled vapor condensor 23 which may be of conventional design of the type used for air conditioning. Illustrative of such units is the vapor condensor described in "Perry's Chemical Engineers' Handbook," 4th Ed., FIG. 11-12, p. 11-16.

As vapor condenses within the vapor condenser, its contained heat is transferred to relatively cold air pumped into the condenser by blower 25 via conduit 27. The cold air temperature is raised by this process to on the order of 72° F. The warm air is exhausted from condenser 23 via conduit 29 and can then be used in the conventional manner for heating living space or the like.

Condensed water vapor formed in vapor condenser 23 is pure potable water regardless of the purity of the water used as feed in the freezer. The resulting product water is removed from condenser via conduit 31 by product pump 33. The product water will typically leave condenser 23 at a temperature of 92° F. and can be used as a source of potable water for drinking, bathing or the like or it may simply be discarded. It may also be combined with washed ice separated from the ice slurry to melt the ice, thereby increasing the available supply of potable water. Alternatively it can be used as feed for the triple point freezer as shown in FIG. 1a thereby achieving a reduction in overall energy requirements for the system.

The product water may also be used to humidify incoming air prior to its introduction into vapor condenser 23 as shown in FIG. 1b. The construction and operation of this embodiment is essentially identical to that of the system shown in FIG. 1a, however in this embodiment product water from condenser 23 is pumped by product pump 33 or allowed to flow by gravity via conduit 31 into a humidifier 35 which may be of any conventional design. In its simplest form product water is sprayed into an open space within the humidifier while cold air is circulated through the same space.

The air is pumped into the humidifier through conduit 37 and out by conduit 38 by the action of blower 25 which then pumps the thus humidified air into condenser 23 via conduit 27 as in the system shown in FIG. 1a. Unevaporated product water is collected at the bottom of humidifier 35 and removed by conduit 39.

In both embodiments shown in FIGS. 1a and 1b the ice slurry can be discarded, used for refrigeration or air conditioning or as a source of ice for preservation of foodstuffs. The water can be returned to the freezer as feed or if sufficiently pure as is normally the case, can be used as a source of potable water. The ice may be melted and also used as a source of potable water or returned to the freezer as feed.

The ice slurry formed in freezer 10 should not be permitted to exceed an ice fraction of about 25% because above that concentration the slurry becomes very viscous and difficult to pump. It is preferred therefore to regulate the flow of feed entering the freezer via conduit 11 to provide a flow rate which will maintain the ice fraction in the slurry preferably below about 20% by weight.

Dissolved gases present in the water fed to the freezer will be released by the boiling action in the freezer. These gases, and any air that leaks into the system because it is under vacuum, will be delivered to the vapor condenser and if permitted to accumulate will eventually begin to reduce the efficiency of the heat transfer process. These gases, together with some water vapor, are preferably removed from the vapor condenser via conduit 41 and vacuum pump 42 as shown in FIG. 1a. One type of vacuum pump suitable for this purpose is illustrated by hurling water pump 60 described in U.S. Pat. No. 3,425,235. Some system for removing non-condensable gases is important and preferably employed in all embodiments of this invention to maintain optimum efficiency.

The heat pump systems of FIGS. 1a and 1b are quite simple; however for many applications, a multistage compressor of the capacity and compression ratio required (typically 8.5) may not be available or economically practical. The heat pump system of FIG. 2 offers an attractive alternative particularly if the available feed water supply is normally pure water rather than seawater.

In the embodiment of the invention illustrated in FIG. 2 the system is comprised of a two-stage heat pump cycle which is suitable for medium size heating plants. This is a preferred embodiment as it is believed to offer an advantageous compromise between initial investment and operating cost. Referring now to FIG. 2, once again a triple point freezer 10 is the primary heat source. Feed water enters through line 11 and the ice-slurry mixture formed within the freezer 10 is withdrawn through conduit 13 by pump 15.

Water vapor produced by the boiling of feed water in freezer 10 is removed continuously via conduit 17 by a single-stage vapor compressor 43 driven by a suitable prime mover such as an electric motor (not shown). When non-saline water is used as the water feed for freezer 11, the required compression ratio of the single-stage vapor compressor is typically 1.08. Air compressors of a size, capacity, and compression ratio required for a typical installation are readily available from commercial suppliers. It should be noted that due to the very low absolute pressures present in this system, the power to compress the evolved vapor is only a small fraction of that required to compress a similar volume of air at atmospheric pressure.

The compressed vapor from the compressor 43 is discharged via conduit 45 into an evaporator 47. The evaporator 47 is of conventional design and consists of a shell 48, compressed water vapor inlet conduit 45, a condensed water vapor outlet conduit 50, a non-condensables outlet conduit 51, and a refrigerant evaporator coil 52. A liquified refrigerant, such as ammonia or Freon-12 is contained within evaporator coil 52. In a typical arrangement the refrigerant boils at a temperature of 25° F. and has a boiling heat-transfer coefficient of about 1000 BTU/hr. ft$^2$ ° F. Compressed water vapor passes into the evaporator 47 via conduit 45 where it contacts the cold exterior of the evaporator coil which causes the vapor to condense on the coil, for example at a temperature of 33° F. and a condensing heat transfer coefficient of 6000 BTU/hr. ft$^2$ ° F. (The boiling-freezing coefficient in the triplepoint freezer is 20,000 to 40,000 BTU/hr ft$^2$ ° F.) Because of the high condensing coefficient, the water vapor will condense on the cold coil at 33° F. indefinitely without freezing. As the water vapor condenses, it gives up its heat of evaporation (extracted from the ice formed in the freezer) to the boiling refrigerant, causing the refrigerant to vaporize. The cold vaporized refrigerant is delivered via conduit 53 to the refrigerant compressor 55. The condensed water vapor is continuously removed from evaporator 47 by product pump 50a via conduit 50 for use as potable water or recycled as feed to freezer 10. The accumulated non-condensable gases are removed via conduit 51 by a vacuum pump 51a.

Compressed refrigerant vapor is pumped by compressor 55 via conduit 56 into condenser 57. Condenser 57 is of typical design and consists of a shell 57a having a cold air inlet conduit 58 and a warm air outlet conduit 59; and air-cooled refrigerant condensing-coil 63 having a condensed refrigerant outlet conduit 60 including expansion valve 61 and return to evaporator 47 to complete the closed refrigerant loop.

Compressed refrigerant vapor from the refrigerant compressor 55 is discharged into the air-cooled refrigerant condensing coil 63 via conduit 56. In the coil the refrigerant vapor is condensed by heat exchange with cold air passing over the outside of coil 63 giving up its heat of vaporization to the air as it passes over the outside of the coil. The heat transfer coefficient of the condensing refrigerant is on the order of 1000 BTU/hr ft$^2$ ° F. The heat transfer coefficient from the outside of the coil to the air is only 2 to 5 BTU/hr ft$^2$ ° F., depending on air velocity, and therefore a finned coil is preferably used to provide increased surface area for overall higher heat exchange efficiency.

To complete the cycle, the condensed refrigerant is returned to coil 52 of the evaporator via conduit 60, through expansion valve 61. Expansion valve 61 is provided to maintain the pressure difference between the evaporating and condensing refrigerant coils.

FIG. 3 illustrates still another embodiment of the invention in which a heat pump cycle is used which has no vapor compression stage. This embodiment of the invention is especially suited for the utilization of high saline content feed water, such as seawater, as the primary heat source. Because such high saline content liquids freeze at very low pressures, the use of a single stage compressor, as in the previously described configuration, is not economically practical because of the very high compression ratio (about 1.5 in the case of seawater) required to achieve satisfactory operation.

In this embodiment, as in those previously described, the process begins with triple point freezer 10. Water vapor produced by boiling in the freezer 10 is removed continuously via conduit 17 and discharged into the interior of condenser/evaporator 65 and flows down over evaporator coil 67 through which liquid refrigerant is continuously passed. The thermodynamic impetus of water vapor toward the very cold evaporator coil 67 is sufficient to maintain a continuous flow of water vapor from freezer 10 and to reduce the pressure within the freezer to the triple point where freezing and boiling of the feed liquid occurs simultaneously. As in previous embodiments feed water enters freezer 10 continuously via conduit 11 while ice formed in the freezer is removed as a slurry via conduit 13 by slurry pump 15.

Liquid refrigerant passing through coil 67 is vaporized by heat liberated through condensation of water vapor within the interior of condenser/evaporator 65. The refrigerant employed can be any of the commonly used refrigerants such as the fluorocarbons. Vaporized refrigerant is removed continuously from condenser/evaporator 65 via conduit 69 by compressor 71. Compressed refrigerant vapor is passed via conduit 69a through condenser coil 73 located within the interior of condenser/evaporator 75 where it is condensed to a liquid state by the partial evaporation of relatively cold dilute antifreeze solution passing over the exterior of coil 73.

The now liquid refrigerant is removed from condenser/evaporator 75 via conduit 73a through a reducing valve 74 and thence into conduit 67 of condenser/evaporator 65, thereby completing the closed refrigerant loop. A circulating flow of antifreeze solution is superimposed over the refrigerant loop just described. Antifreeze solution which may be any of the commonly used relatively non-volatile solutions such as salt/water or ethylene glycol/water is admitted to the interior of condenser/evaporator 65 via conduit 77 where it flows down over the outside of refrigerant coil 67. Water vapor entering via conduit 17 condenses on the colder antifreeze solution simultaneously warming and diluting the solution which is at the same time cooled to a temperature below the temperature within freezer 10 by passage over the much colder refrigerant coil 67 and which in turn results in vaporization of the refrigerant within coil 67. The now diluted antifreeze solution is removed from condenser/evaporator 65 by circulating pump 79 via conduit 79a and thence via conduit 80 to condenser/evaporator 75 where it is sprayed into the top of the unit and flows by gravity over the exterior of hot refrigerant coil 73. Heat liberated, as the compressed refrigerant vapor within the coil condenses, is transferred through the coil wall into the dilute antifreeze solution causing a portion of the solution to evaporate, thereby reconcentrating the solution. The concentrated antifreeze solution is withdrawn from the bottom of condenser/evaporator 75 via conduit 81 and pumped by recirculating pump 82 through conduit 77 into condenser/evaporator 65 to complete the antifreeze loop.

The hot water vapor produced by evaporation of antifreeze solution within condenser/evaporator 75 moves via conduit 84 into water vapor condenser 85 and travels through coil 86 where it is condensed into liquid form by the passage of cold air over the outside of coil 86. The resulting pure liquid water is removed from condenser 85 by pump 87 via conduit 88. As in the previously described embodiments this pure water, exiting typically at a temperature on the order of 90–95° F., can be used for a variety of purposes such s bathing or for drinking water.

Cold air used to condense water vapor in condensor 85 is pumped by pump 89 via conduit 90 into the interior of condensor 85 where it passes over the outer surface of coil 86 and exits via conduit 91. Air passing over the coil is heated by the heat released by water vapor condensing within the coil and can be used for a variety of purposes such as space heating. The flow rate of cold air over the coil is normally adjusted to provide an air temperature of on the the order of 68–72° F. when the exit air is intended for use for space heating. In a like manner the embodiment shown in FIG. 3 can also be used to provide a source of cold air for air conditioning of ambient space during the summer months by the simple expedient of pumping the ice slurry removed from freezer through a coil (not shown) and passing hot air to be cooled over the surface of the coil.

In this embodiment as in the previously described embodiments it is preferable to make provision for the removal of non-condensible gases to maintain thermodynamic efficiency. Removal of such non-condensibles is especially important in condensor/evaporator 65 and can be accomplished in the same manner as described in the previous embodiments.

Another embodiment of the invention is shown in FIG. 4. This system is very similar to the configuration illustrated in FIG. 3. In the embodiment shown in FIG. 4 the system is primarily adapted to the production of potable water from sea water.

As in the FIG. 3 configuration a refrigerant loop and dilute antifreeze solution loop are employed to extract heat from a triple point freezer. This embodiment differs from that of FIG. 3 in that the brine ice slurry withdrawn from freezer 10 is pumped via conduit 13 by pump 15 to an ice washer 93. Ice washer 93 can be of any conventional design but is preferably of a counterflow type, as shown, in which ice rising to the top of the washer 93 is washed by a small quantity of wash water entering via line 93 and sprayed over the exposed upper surface of the ice to remove brine. Brine solution is continuously removed from washer 93 at a point below the ice level via conduit 95 by pump 95a and dumped. Washed ice is continuously removed from washer 93 via line 94 and transferred to ice melter 97 where the ice is melted by warm water vapor produced in evaporator/condenser 75 which is transferred to melter 97 via conduit 84a. The construction and operation of a suitable ice washer and melter is described in more detail in U.S. Pat. No. 3,398,546. Pure potable water is removed from melter 97 via line 96 by gravity of by pump 96a.

The temperature of the water vapor used for melting the ice need only by slightly above freezing and should for reasons of efficiency be kept as low as is practical. Apparatus inefficiencies, due to friction and the like, introduce sizeable amounts of heat into the system. It is therefore desirable, and in some cases necessary to employ heat rejection means to remove the excess thermal energy content of the water vapor resulting from such inefficiencies. This can be accomplished in a variety of ways, as for example: through the use of a water vapor condenser as shown in FIG. 3 or by placing the water vapor in direct heat exchange relation with a coolant. However, heat rejection is preferably accomplished by installing a heat rejection by-pass in the refrigerant loop, as shown. This may be done simply by diverting a portion of the compressed refrigerant from conduit 69a into conduit 70 by compressor 72 into heat exchanger 98 where it is cooled by seawater pumped through heat exchanger 98 via conduit 99 by pump 100.

The compressed refrigerant is thereby condensed and cooled, after which it is returned to the refrigerant loop via conduit 101 through an expansion valve 102 which serves to maintain a pressure differential. This heat rejection system is needed to provide the necessary heat removal for starting the system and for removing heat which enters the low temperature system from various sources such as entering feed, high ambient temperatures and inefficiencies in the mechanical equipment in the system itself. Heat removal can also be accomplished by providing a refrigerated coil in the melter or by introducing additional ice into the melter from another source or by a combination of these means.

Those skilled in the art will understand the need for adjusting the operating temperature of the various elements of the system in accordance with the primary purpose of the unit. The means for adjusting temperatures as for example by varying flow rates, increasing or decreasing heat exchange surfaces and the like are all well known conventional techniques. Temperature balancing and sizing of individual components will be dictated by the primary design requirments for a particular installation and pose no unusual problems for those skilled in the art.

Start-up of heat pump systems is effected simply by starting up operation of the various mechanical components such as pumps and blowers employed in the various configurations of this invention.

When a source of fresh water is available and the primary purpose of the unit is other than for the production of potable water it is preferable to employ fresh water as the feed liquid for the triple point freezer due to its higher freezing temperature. The lower freezing temperature of salt water increases the temperature differential requiring the expenditure of more energy to achieve equivalent heating. In general it can be said that the higher the freezing temperature of the feed liquid, the higher the temperature at which vapor is produced; the greater is the density of the vapor and thus the smaller is the compression ratio and capacity required for vapor compression.

The heat system of this invention readily lends itself to multipurpose installations for both heating (as described) and cooling living space. During summer months, air to be cooled can be passed into direct contact with ice withdrawn from the freezer thereby cooling the air and also dehumidifying it. For example, air at 90° F. and 60% relative humidity contains 130 grains of water vapor per pound of dry air. However at 32° F. and 100% relative humidity (fully saturated with water) the moisture content is only 26.5 grains of water per pound of dry air. When warm humid air is contacted with ice not only is the air cooled but a substantial part of the moisture content (80% in the example given) of the warm air is removed by condensation on the ice. It will be appreciated that a broad choice of temperature and humidity ranges can be achieved simply by mixing appropriate quantities of moist warm air with cooled air. Air cooling by direct contact with ice has a particular advantage due to the elimination of costly metal heat-transfer surfaces.

Ice withdrawn from the triple point freezeer can also be advantageously used for preservation of foodstuffs such as vegetables or fish for storage or shipment. Ice crystals formed in a triple-point freezer have a disc or plate configuration and a very soft feel which makes them particularly well suited for such use.

I claim:

1. A heat pump or refrigeration system which comprises: an evaporation chamber; a condenser; means for introducing water or water solution into said evaporation chamber; means for creating a vacuum in said evaporation chamber sufficient to cause a portion of said water or water solution to vaporize and another portion to freeze; means, which may be the same means as is employed for creating said vacuum, for withdrawing and compressing vapor produced within said evaporation chamber and transferring the compressed vapor to said condenser; means for exchanging the heat content of said compressed vapor with a working fluid, thereby condensing said vapor; means for discharging said condensed vapor or returning said condensed vapor to said evaporation chamber and means for continuously removing ice from said evaporation chamber.

2. A system according to claim 1 wherein said condensed vapor is combined with said ice after said ice has been removed from said evaporation and washed to melt said ice, thereby producing potable water.

3. A system according to claim 1 wherein said working fluid is air and pump means is provided to circulate said air through said condenser means.

4. A system according to claim 3 wherein said air is passed through a humidifier prior to entry into said condenser and said condensed vapor is passed from said condenser into said humidifier as a source of moisture for said air.

5. The system of claim 1 including means for removing non-condensible gases from within said condenser.

6. The system of claim 1 including a closed refrigerant loop which comprises said condenser as one element of said loop; a refrigerant as said working fluid; means for withdrawing and compressing vaporized refrigerant from said condenser and transferring said compressed refrigerant to a second condenser; means within said second condenser for placing said refrigerant in out-of-contact heat exchange relationship with a second working fluid whereby said refrigerant is condensed and said second working fluid is heated; means for returning said condensed refrigerant to said condenser; and means for continuously passing said second working fluid through said second condenser.

7. A heat pump or refrigeration system which comprises:
A. an evaporation chamber;
B. means for introducing water or water solution into said evaporation chamber;
C. a closed refrigerant loop which comprises:
   a. a first condenser;
   b. a second condenser;
   c. a refrigerant fluid;
   d. means for continuously circulating said refrigerant fluid from said first condenser to said second condenser and back to said first condenser;
D. means for passing water vapor produced in said evaporation chamber to said first condenser and placing said water vapor in indirect heat exchange relation with said refrigerant fluid;
E. means for continuously removing ice from said evaporation chamber;
F. an aqueous antifreeze solution loop which comprises:
   a. means for transferring concentrated antifreeze solution from said second condenser to said first condenser into direct heat exchange relation with said water vapor and indirect heat exchange relation with said refrigerant fluid;
   b. means for transferring dilute antifreeze solution from said first condenser to said second condenser and into indirect heat exchange relation with said refrigerant fluid;
G. a third condenser;
H. means for transferring water vapor from said second condenser to said third condenser;
I. means for placing ice or a working fluid in heat exchange relation with said water vapor within said third condenser;
J. means for removing water from said third condenser.

8. A system according to claim 7 including means for compressing refrigerant vapor removed from said first condenser and passing compressed refrigerant vapor into said second condenser.

9. A system according to claim 7 including means for removing non-condensible gases from said first condenser.

10. A system according to claim 7 wherein said working fluid is air and means is provided for continuously passing air through said third condenser in indirect heat exchange relation with said water vapor.

11. A system according to claim 7 wherein means is provided for removing excess heat from the system.

12. A system according to claim 7 wherein means is provided for continuously placing air in heat exchange relation with said ice removed from said evaporator to provide a source of relatively cold air for space cooling.

13. A system according to claim 7 wherein water removed from said third condenser is employed as a source of water for introduction into said evaporation chamber.

* * * * *